Feb. 16, 1954   J. J. DEAN   2,669,212
TURN INDICATOR FOR VEHICLES
Filed July 7, 1950   2 Sheets-Sheet 1
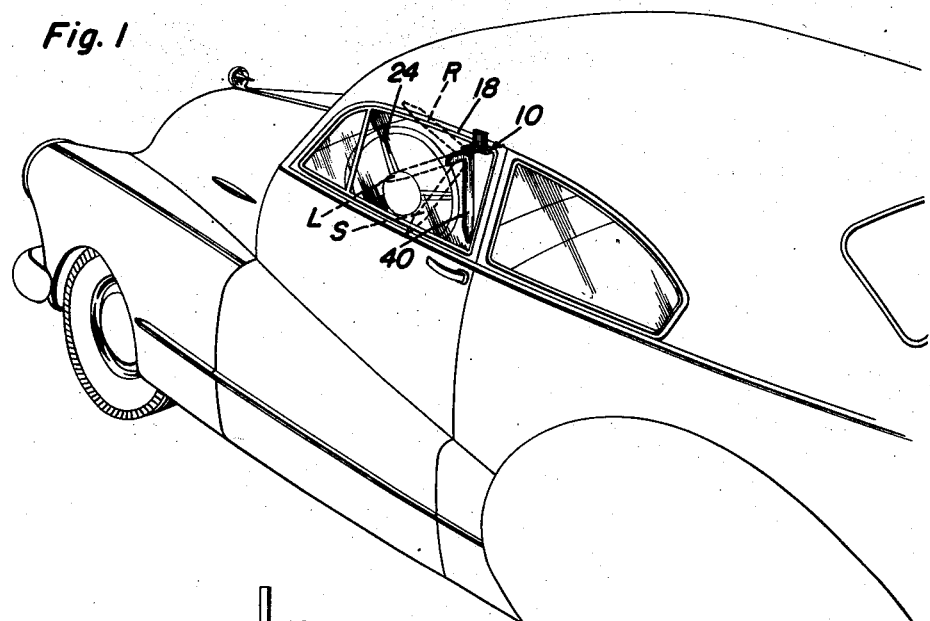
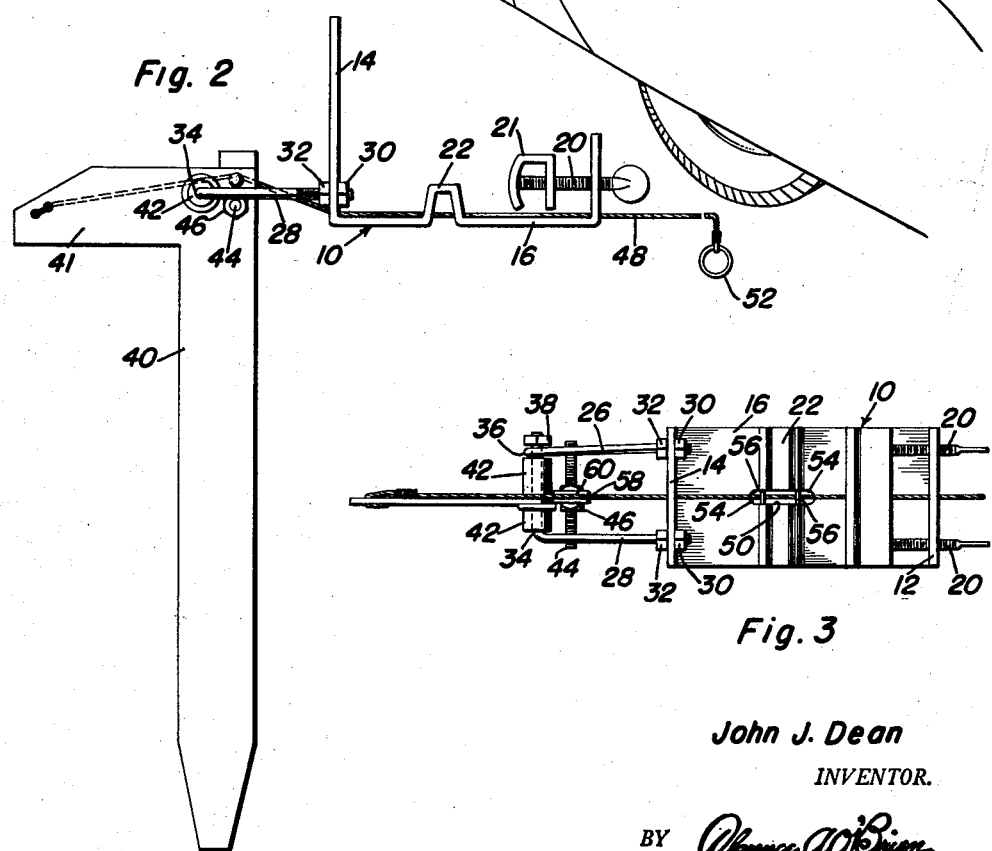
John J. Dean
INVENTOR.

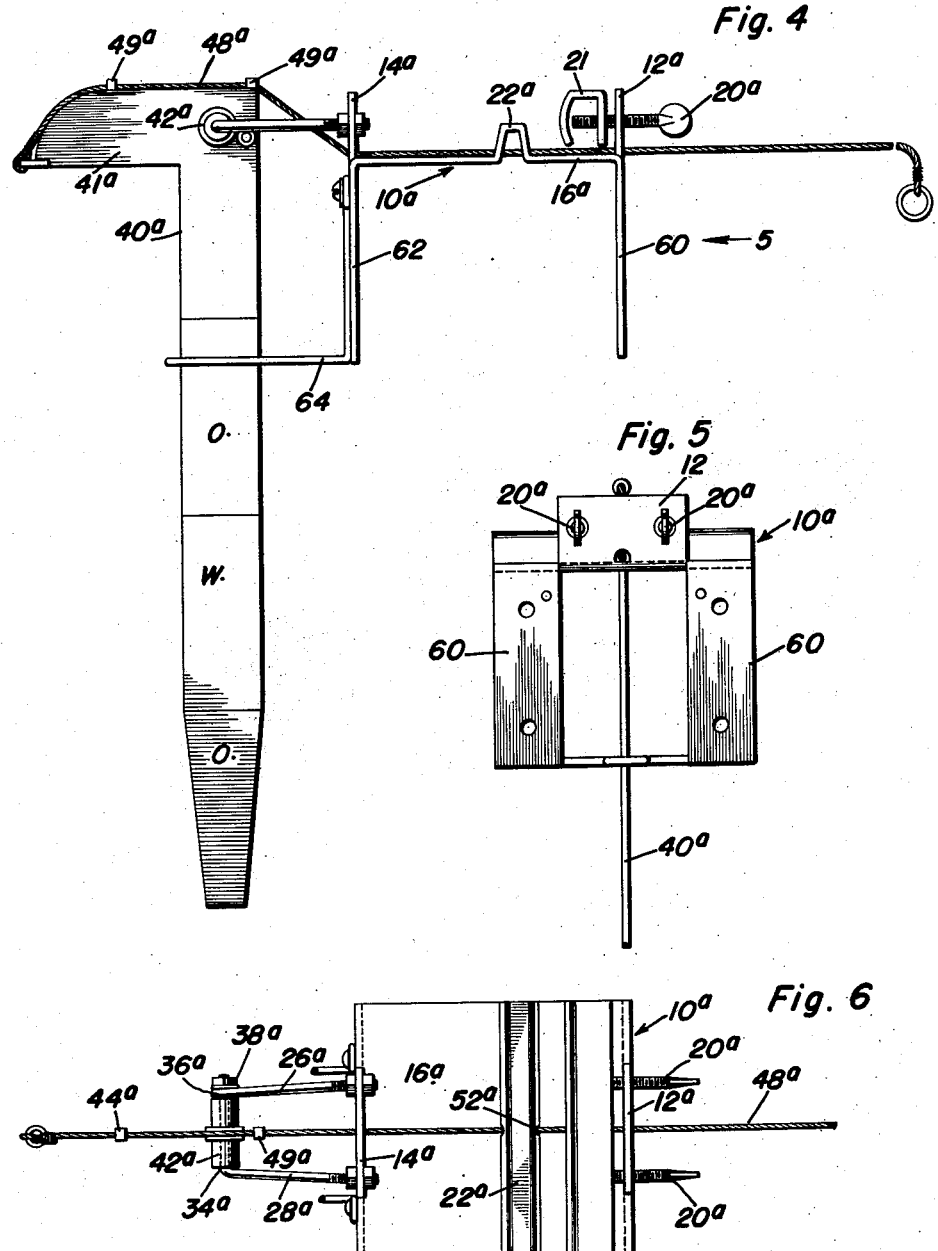

Patented Feb. 16, 1954

2,669,212

UNITED STATES PATENT OFFICE 2,669,212

TURN INDICATOR FOR VEHICLES

John J. Dean, Pomona, Calif.

Application July 7, 1950, Serial No. 172,513

8 Claims. (Cl. 116—52)

This invention relates to new and useful improvements in signaling devices and the primary object of the present invention is to provide a vertically swinging signal arm and a novel and improved supporting bracket for the arm that is quickly and readily applied to or removed from the window frame of a vehicle in a convenient manner.

Another important object of the present invention is to provide a turn indicator for vehicles that embodies an attaching or mounting bracket having a hollow rib for entering the window receiving channel of a window frame and which bracket will occupy very little space of a window opening to permit the window to be entirely raised to exclude rain from the interior of the vehicle on which the indicator is mounted.

Yet another object of the present invention is to provide a signal device of the aforementioned character wherein the bracket swingably supports a signal arm and an operating cord slidably carried by the bracket and attached to the arm to permit a vehicle operator to impart a swinging movement to the arm by a pull on the cord.

A further object of the present invention is to provide a turn indicator for vehicles that is extremely small and compact in structure and which is so located at one side of a vehicle to indicate to vehicles approaching the rear or front of the vehicle supporting the indicator that a turn is about to be made.

A still further aim of the present invention is to provide a signal indicator that is simple and practical in construction, strong and reliable in use, neat and attractive in appearance, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of a vehicle as showing the present invention mounted thereon, and with dotted lines showing alternate positions of the signal arm;

Figure 2 is an elevational view of the turn indicator;

Figure 3 is a top plan view of Figure 2;

Figure 4 is an elevational view of the present invention in modified form;

Figure 5 is a side elevational view of Figure 4, taken substantially in the direction of arrow numbered 5 in Figure 4; and, Figure 6 is a top plan view of Figure 4.

Referring now to the drawings in detail, wherein for the purpose of illustration, there is disclosed a preferred embodiment of the present invention, the numeral 10 represents a channel shaped bracket including inner and outer vertical flanges 12 and 14 and a horizontal web 16 joining the flanges 12 and 14.

The mounting bracket 10 will receive the window frame 18 of a vehicle, and more specifically the upper rail of the frame 18, and the flange 12 is provided with internally threaded horizontal apertures that receive clamping screws 20 for tightening against the frame 18 to retain the bracket 10 upon the said frame 18.

A hollow longitudinal rib 22 is pressed upwardly from the web 16 and parallels the flanges 12 and 14. This rib will enter the window receiving channel of the frame 18 to center the bracket 10 and to permit the web 16 to be positioned relatively close to the upper rail of the frame 18 so that the vehicle window 24 may be completely raised.

The outer flange 14 supports a pair of horizontally projecting, parallel rods 26 and 28. The inner threaded ends of the rods 26, 28 extend through accommodating apertures in the flange 14 and each support a pair of nuts 30 and 32 that clamp the flange 14 therebetween. The outer end of the rod 28 is bent to form a horizontal extension 34 that extends through an eye 36 at the outer end of the rod 26. The outer extremity of the extension is threaded to receive a nut 38 that retains the extension 34 through the eye 36.

The apex of a flat substantially L-shaped signal arm 40 supports a horizontally extending bearing composed of two registering sleeves 42 that are suitably fixed to the arm 40 and which register with an opening in the arm 40. The extension 34 extends through the sleeves 42 and the opening in the arm 40 to permit vertical swinging movement of the arm 40.

A horizontal stop rod 44 extends through the apex of the arm 40 and supports a pair of nuts 46 that clamp the arm 40 therebetween. The ends of the rod 44 underlie the rods 26, 28 and will abut the rods 26, 28 to prevent the arm 40 from swinging inwardly against the side of the vehicle.

An operating cord or thin cable 48 is attached at one end to the shorter leg 41 of the arm 40, extends through registering apertures in the flanges 12, 14 and a transverse slot or opening 50 and its free end supports a finger grip in the form of a ring 52. The slot 50 includes ends 54 that extend into the web 16. Guide pins 56 extend transversely across the ends 54 of the slot 50, overlie the cord 48 and are suitably fixed to the web 16.

A guide plate 58 is secured by a rivet or the like to the arm 40 and includes a smooth offset 60 over which is trained the cord 48 to prevent wearing of the cord as the latter is pulled to raise the arm 40.

In practical use of the device, the ring 52 is received within the interior of the vehicle and is manually pulled to raise the arm 40 to a position R for indicating a right turn, a position L for indicating a left turn or a position S for indicating a stop or slow down.

The arm 40 is so positioned as to indicate to motorists approaching the rear and front of the signal that a turn is about to be made. The arm 40 may support a lamp bulb or flashlight for indicating signals at night but since the device is to be produced at a cost beneficial to the purchasing public, it is intended that the arm 40 be painted of an easily visible color or with phosphorescent material for night signaling.

Figures 4, 5 and 6 illustrate the present invention in slightly modified form wherein the mounting bracket 10a is substantially channel shaped to include inner and outer flanges 12a and 14a that are joined by a web 16a. The flange 12a supports clamping screws 20a and a hollow rib 22a rises from the web 16a.

The flange 14a supports a pair of horizontal rods 26a and 28a with the outer end of the rod 28a bent to form a horizontal extension 34a that extends through an eye 36a at the outer end of the rod 26a. The extension 34a supports a nut 38a that retains the extension 34a in the eye 36a.

The substantially L-shaped signal arm 40a supports a horizontal bearing 42a at its apex through which the extension 34a extends to permit vertical swinging movement of the arm 40a.

One end of an operating cord 48a is attached to the shorter leg 41a and the cord 48a is secured against the upper edge of the leg 41a by clips 49a. The cord 48a extends through registering apertures in the flanges 12a and 14a as well as a transverse opening 52a in the rib 22a.

A pair of holding arms or flanges 60 and 62 are struck downwardly from the ends of the flanges 12a and 14a and will support any suitable means, such as an air conditioning unit or service tray.

The arm 40a is preferably painted with orange and white areas O and W on both faces to permit convenient viewing of the arm as it is raised and lowered by the cord 48a.

The flanges 62 each support a guide or retainer angle wire member 64 to prevent lateral movement of the arm 40a.

An important feature of the invention is the provision of a mounting for the turn indicator, when clamp is used, that is mounted on a car window and which permits the car window to be completely raised and operation of the signal from a point at the inside of the car, so that in inclement weather the driver may close the window completely and still operate the signal.

The fasteners 20 and 20a support substantially U-shaped resilient pressure elements 21 that will yieldingly bear against a window frame of a vehicle.

If an air cooler is attached to the flanges 60, the window will close up to the air intake from outside, approximately one inch, whereas the use of the flange 60 for supporting other articles will permit complete raising of the window.

Having described the invention, what is claimed as new is:

1. A turn indicator for vehicles comprising a one piece channel shaped mounting bracket for attachment to a vehicle window frame and including spaced vertical flanges, clamping screws carried by one flange of said bracket for retaining the bracket on a vehicle window frame, a vertically swinging arm pivoted on the other flange of said bracket and adapted to be disposed exteriorly of and at one side of a vehicle, and an operating cord slidably carried by said bracket and attached to said arm, said bracket including inner and outer upstanding flanges and a web permanently joining said flanges, and a hollow open ended rib on the web and paralleling said flanges for reception in the window receiving channel of a vehicle window frame.

2. The combination of claim 1 wherein said hollow rib includes a transverse opening receiving said operating cord; and guide means carried by said web retaining said cord in said opening.

3. A turn indicator for vehicles comprising a one piece channel shaped mounting bracket for attachment to a vehicle window frame, said bracket including inner and outer vertical flanges and a horizontal web joining said flanges, clamping screws carried by the inner flange for securing the bracket to a window frame, a pair of horizontally extending rods carried by said outer flange, and eye at one end of one of said rods, a horizontal extension at one end of the other of said rods, said extension extending through said eye, an arm mounted on said extension for vertical swinging movement, and an operating cord slidably carried by said bracket and attached to said arm.

4. The combination of claim 3 and a horizontally projecting stop carried by said arm and underlying said rods to limit downward swinging movement of said arm.

5. A turn indicator for vehicles comprising a channel shaped mounting bracket for attachment to a vehicle window frame, said bracket including inner and outer vertical flanges and a horizontal web joining said flanges, clamping screws carried by the inner flange for securing the bracket to a window frame, a pair of horizontally extending rods carried by said outer flange, an eye at one end of one of said rods, a horizontal extension at one end of the other of said rods, said extension extending through said eye, a substantially L-shaped arm, a horizontal bearing sleeve at the apex of said arm receiving said extension, an operating cord slidably carried by said bracket and attached to said arm, and a horizontal stop carried by the arm and underlying said rod to engage the rods and limit downward swinging movement of said arm.

6. The combination of claim 5 and a hollow rib on said web having an opening slidably receiving said cord, said rib adapted to enter the window receiving channel of a vehicle window frame.

7. The combination of claim 5 and a smooth surfaced guide plate slidably supporting the cord, said plate being secured to said arm and underlying said cord.

8. The combination of claim 5 wherein said arm includes colored areas.

JOHN J. DEAN.

References Cited in the file of this patent

UNITED STATES PATENTS

| Number | Name | Date |
|---|---|---|
| 1,340,292 | Rice | May 18, 1920 |
| 1,630,405 | Nihell | May 31, 1927 |
| 1,846,781 | Ayotte | Feb. 23, 1932 |
| 1,866,107 | Hiering | July 5, 1932 |
| 1,873,033 | Reynolds | Aug. 23, 1932 |
| 2,318,690 | Humphrey | May 11, 1943 |
| 2,327,905 | Kershaw | Aug. 24, 1943 |